United States Patent [19]

Matsumoto

[11] 4,438,909

[45] Mar. 27, 1984

[54] VEHICLE FRONT FORK

[75] Inventor: Fumio Matsumoto, Shizuoka, Japan

[73] Assignee: Showa Manufacturing Co., Ltd., Tokyo, Japan

[21] Appl. No.: 296,646

[22] Filed: Aug. 27, 1981

[30] Foreign Application Priority Data

Sep. 16, 1980 [JP] Japan .................. 55-127315

[51] Int. Cl.³ .............................................. F16F 9/06
[52] U.S. Cl. .................................. 267/64.26; 188/287
[58] Field of Search .............. 188/281, 282, 285, 287; 267/64.15, 64.26

[56] References Cited

U.S. PATENT DOCUMENTS 3,797,615  3/1974  Stembridge .............. 188/287 X
4,013,149  3/1977  Fabre et al. ............. 188/281

FOREIGN PATENT DOCUMENTS 720302  6/1942  Fed. Rep. of Germany ...... 188/287

*Primary Examiner*—Duane A. Reger

*Attorney, Agent, or Firm*—A. W. Breiner

[57] ABSTRACT

Herein disclosed in a front fork for a two-wheeled vehicle, in which a fork tube carrying a piston at its lower end is slidably fitted in a bottom casing filled with working oil, in which a seat tube fixed to the bottom portion of the bottom casing has its upper portion inserted into the fork tube, in which a check valve operating so as to be closed upon contraction of the fork and opened upon extension of the fork is carried by the lower end of the fork tube, in which a check valve operating so as to be opened upon the contraction of the fork and closed upon the extension of the fork is slidably fitted on the fork tube above the piston, in which as orifice is formed in the fork pipe thereby to provide communication between the inside and outside thereof, and in which a plurality of orifices are formed in the seat tube and are arranged in the axial direction of the same. The front fork tube constructed can improve the riding comfort and hold steering stability which are independent of the conditions of a road surface.

4 Claims, 5 Drawing Figures

VEHICLE FRONT FORK

This invention relates to a front fork for a two-or three-wheeled vehicle. A construction of such fork has been disclosed in U.S. Pat. No. 4,013,149 to Fabre et al. and Japanese Utility Model No. 9060/53 published on Mar. 9, 1978 and is so constructed as to generate a weak damping force upon contraction and a strong damping force upon extension. Consequently, especially when the front wheel drops in a depression in the road, damping force can be hardly attained. Even when the front wheel runs over a bump in the road, the shock is transmitted to the rider, because the initial damping force is relatively strong, so that sufficiently satisfactory riding comfort and steering stability cannot be attained.

According to the present invention a front fork for a two wheeled vehicle comprises a bottom casing filled with working oil and slidably receiving a fork tube carrying a piston at its lower end, a seat tube fixed to the bottom portion of the bottom casing and extending into the fork tube, a first check valve carried by the lower end of the fork tube and operating so as to be closed upon contraction of the fork and opened upon extension of the fork, a second check valve overlying the piston and operating so as to be opened upon contraction of the fork and closed upon extension of the fork, the fork tube having an orifice for providing communication between the inside and outside thereof and an axially extending row of orifices formed in the seat tube.

The effect of such a construction can best be described with reference to a particular example, as illustrated in the accompanying drawings, in which.

Figure 1:
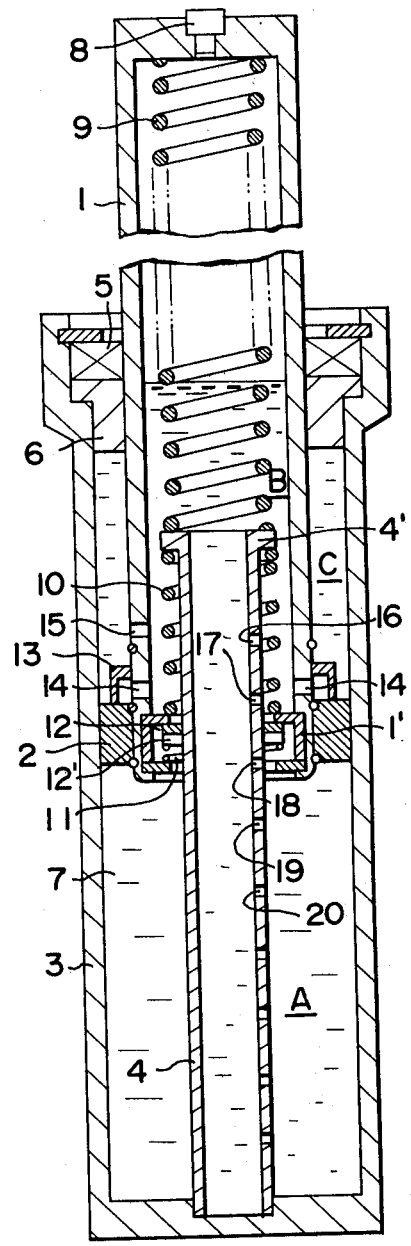
FIG. 1 is a longitudinal section showing a construction of front fork according to the present invention.

As shown in FIG. 1, a piston 2 is carried on the lower end of a fork tube 1 which is fastened to the front portion of a vehicle body. The fork tube 1 is slidably fitted in a bottom casing 3 which is fastened to the axle of the front wheel and a seat tube 4 fixed to the bottom of the bottom casing extends upwardly into the fork tube 1.

The bottom casing 3 is equipped with an oil seal 5 and a tube guide 6 at its upper end and is filled with working oil 7. The fork tube 1 is equipped at its upper end with an air valve 8 which confines air or other gas under a suitable pressure in the space above the oil surface. A suspension spring 9 is mounted under compression between the upper side of a spring seat 4' mounted on the upper end of the seat pipe 4 and the upper end of the fork tube 1 and a balance spring 10 is mounted under compression between the lower side of the spring seat 4' of the seat tube 4 and a valve seat 1' fitted in the lower end of the fork tube so that the fork tube is stabilised at a position where the difference in compression between the springs 9 and 10 is balanced by a load.

Figure 1A:
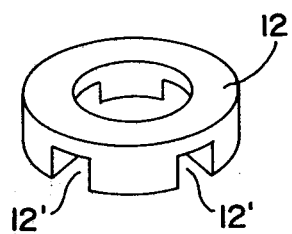
FIG. 1A is a perspective view showing a check valve used in the present invention.

At the lower end of the fork tube 1 is a check valve 12 which is formed by a ring slidably fitted on the seat tube 4 and formed with a radial groove 12' in its lower side as shown FIG. 1A and which is urged towards the valve seat 1' by a spring 11. An annular check valve 13 is also slidably fitted on the fork tube above the piston 2 and the fork tube is formed with oil ports 14 opening into the check valve 13. The check valve 12 is respectively opened and closed upon the extension and contraction of the fork, whereas the check valve 13 is respectively closed and opened upon the extension and contraction of the fork. The fork tube 1 is formed with spaced orifices 15 and the seat tube 4 is also formed with a series of orifices 16 to 20 and so on which are spaced in the axial direction.

When the front fork having the construction thus far described contracts, the oil pressure in the oil chamber A below the piston 2 is raised so that the check valve 12 is held in its closed state, as previously described, and the oil pressure in the oil chamber B in the fork tube 1 is also raised so that the check valve 13 is opened thereby to supply the oil from the oil ports 14 to the oil chamber C above the piston 2. As a result, the oil below the piston 2 flows into the fork tube 1 via the orifices 18, 19 and so on, which lie below the check valve 12, thereby generating a damping force corresponding to the total area of the aforementioned orifices. Therefore, if the descending velocity of the fork tube is assumed to be constant, the damping force F is increased with the increase of the down stroke L thereof, i.e. as successive orifices are covered by the piston, as indicated by a curve $\alpha$ in FIG. 2.

On the other hand, when the contracted fork is caused to extend, the oil pressure in the oil chamber C above the piston 2 is raised to close the check valve 13, and the oil pressure in the oil chamber A below the piston is lowered so that the check valve 12 is opened to supply the oil chamber A below the piston 2 with the oil in the oil chamber B in the fork pipe 1. On the contrary, the oil in the oil chamber C above the piston 2 flows into the fork tube only via the orifices 15 so that a relatively strong damping force is generated. Specifically, if the extending velocity of the fork is assumed to be constant, the damping force F in this case is expressed by a straight $\beta$ in FIG. 2, since the amount of the oil flowing from the oil chamber B to the oil chamber A through the orifices 16 to 20 can be considered to be such that it supplements the shortage in the oil chamber A, namely, the amount of which is negligible.

Thus, a front fork according to the present invention has its damping force augmented as the fork tube moves down, the rate of increase of force being greater the more the fork is contracted. As a result, if the front wheel is subjected to shocks when it passes over a bump in the road, the fork tube easily moves down to absorb the shock with a weak damping force during an initial stage. Moreover, since the damping force increases and the descending velocity is gradually reduced with the downward movement of the tube, the absorbed energy E is substantially uniformly distributed over a large proportion of the down stroke of the tube, as indicated by a curve $\gamma$ in FIG. 3.

Figure 2:
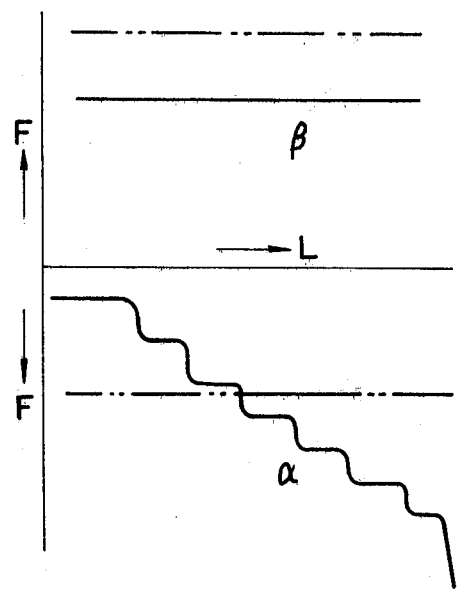
FIGS. 2 to 4 are graphs illustrating characteristics of the front fork of FIG. 1.
Figure 3:
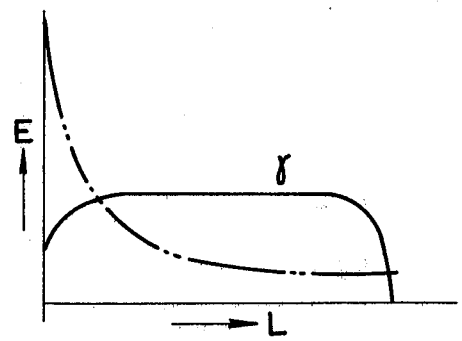

A front fork according to the prior art has its damping force F held substantially at a constant level independently of the tube position L, as indicated by a chain line in FIG. 2, so that the absorption energy E during the contraction is expressed by a chain curve in FIG. 3. As a result, at the instant when shocks are received from the road surface, they are transmitted to the vehicle body and reduce the riding comfort. In a front fork according to the present invention, on the contrary the initial damping force is made sufficiently weak as indicated by the curve $\gamma$, to improve the riding comfort and the absorption energy over the whole stroke during the contraction, i.e. the area enclosed by the curve $\gamma$ is made sufficiently larger than the area enclosed by the chain curve according to the prior art that the shock energy can be effectively absorbed during the contraction stroke.

Figure 4:
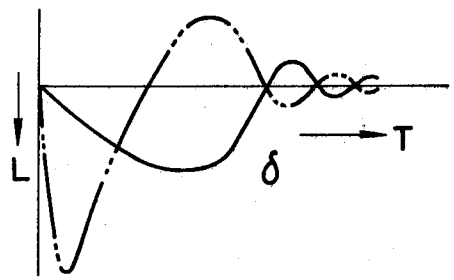

As a result, the damping force upon extension is set at such a low level as is illustrated in FIG. 2 so that shocks caused when the front wheel drops in a depression in the road surface can be sufficiently damped. In FIG. 4 a solid curve δ expresses the relationship between the compression stroke L and the time T for a front fork of the present invention, i.e. the vibration waveforms, whereas a chain curve expresses similar waveforms of a front fork of the prior art.

Since the shock energy is absorbed during the contraction stroke by a front fork according to the present invention, the amplitude is so reduced as to improve the riding comfort. Moreover, if a braking force is applied during the running operation, the weight of the rider is applied to the handle bars so that the fork is contracted. However, since the damping force is strengthened by that contraction, as previously described, the handle can be prevented from diving to any considerable extent, thereby holding the steering stability. Even if the fork is contracted almost to its limit, the damping force is also so greatly increased to provide a beneficial effect that it is unnecessary to additionally provide an oil lock mechanism.

I claim:

1. A front fork for a vehicle comprising a bottom casing filled with working oil and slidably receiving a fork tube having upper and lower ends and carrying a piston at its lower end, a seat tube having upper and lower ends and having the lower end fixed to the bottom portion of the bottom casing and extending into the fork tube, spring means mounted under compression extending between the upper ends of said fork tube and said seat tube and a balance spring mounted under compression between the upper end of the seat tube and the lower end of the fork tube so that the fork tube is stabilised at a position where the difference in the compression between the two springs is balanced with a load, a first check valve carried by the lower end of the fork tube and operating so as to be closed upon contraction of the fork and opened upon extension of the fork, a second check valve overlying the piston and operating so as to be opened upon contraction of the fork and closed upon extension of the fork, the fork tube having an orifice for providing communication between the inside and outside thereof and an axially extending row of orifices formed in the seat tube.

2. A front fork according to claim 1 wherein the first check valve includes a ring with a radial groove in its lower side and a spring for urging the ring against a valve seat.

3. A front fork according to claim 1 or claim 2 wherein the second check valve includes an annular valve body slidably fitted on the fork tube, and oil ports formed in the fork tube inside the valve body.

4. A front fork according to claim 1 wherein the fork tube has its upper end portion filled with gas.

* * * * *